A. A. BIRNIE & A. H. DESILETS.
LEWIS.
APPLICATION FILED APR. 16, 1910.
981,365.
Patented Jan. 10, 1911.
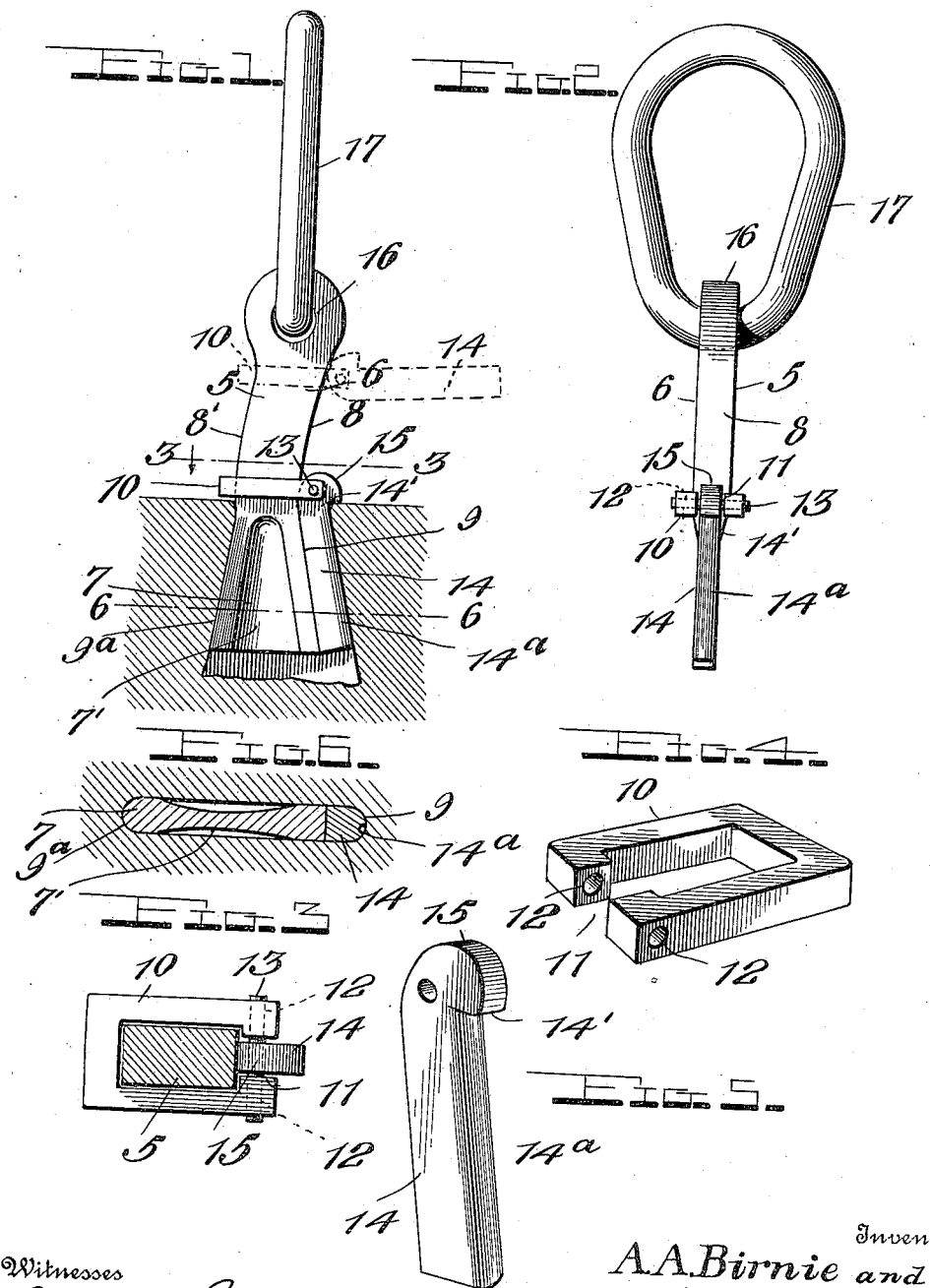
Witnesses
Chas. L. Griebauer.
E. M. Ricketts
Inventors
A. A. Birnie and
A. H. Desilets,
By Watson E. Coleman,
Attorney

UNITED STATES PATENT OFFICE.

ALEXANDER A. BIRNIE AND ALBERT H. DESILETS, OF EAST BARRE, VERMONT.

LEWIS.

981,365.

Specification of Letters Patent.  Patented Jan. 10, 1911.

Application filed April 16, 1910. Serial No. 555,773.

*To all whom it may concern:*

Be it known that we, ALEXANDER A. BIRNIE and ALBERT H. DESILETS, citizens of the United States, residing at East Barre, in the county of Washington and State of Vermont, have invented certain new and useful Improvements in Lewises, of which the following is a specification, reference being had to the accompanying drawings.

This invention relates to certain new and useful improvements in stone lewises and has for its object to provide a very simple device of this character which is strong and durable, highly efficient in its use, and one which may be very economically produced.

Another object resides in the provision of a lewis or stone lifting device which may be very quickly arranged in the lewis hole of the stone and securely grip the walls thereof, a key being adjustably carried by the body of the lewis and adapted to wedge the same in the lewis hole, said key being so formed and arranged upon the shank of the lewis as to permit of its adjustment thereon whereby said key may be positioned out of the way when the lewis is being arranged in the stone.

With these and other objects in view, the invention consists of the novel features of construction, combination and arrangement of parts hereinafter fully described and claimed, and illustrated in the accompanying drawings, in which—

Figure 1 is a side elevation of our improved lewis showing the same engaged with the stone to be lifted; Fig. 2 is an edge view of the lewis; Fig. 3 is a section taken on the line 3—3 of Fig. 1; Fig. 4 is a detail perspective view of the key link; Fig. 5 is a detail perspective view of the key; and Fig. 6 is a detail section taken on the plane indicated by the line 6—6 in Fig. 1.

Our invention relates to stone lifting devices, commonly termed "lewises", and is adapted to be inserted into a hole drilled or otherwise formed in the stone, said hole having a contracted outer end whereby the lewis will wedge against the walls thereof when properly arranged and securely grip the stone to suspend the same from the lifting chain while the stone is being moved from place to place.

Referring more particularly to the drawings forming a part of this specification, 5 indicates the wedge member or body of the device. This wedge member is formed with a substantially rectangular elongated shank portion 6 and the wedge plate proper 7. The wedge plate 7 is provided in each face with a longitudinal concavity 7' whereby the plate may adapt itself to the unevenness of the walls of the lewis hole so that it may be readily fitted into a roughly drilled hole. Each of the longitudinal edges of the plate 7 are obtusely inclined with relation to the shank 6 as shown at 9, one of said edges, however, having greater inclination than the other and said edge is also rounded as shown at 9ª for frictional engagement with one of the rounded end walls of the lewis hole. The longitudinal edges of the upper shank portion 6 of the wedge member are curved as shown at 8.

Upon the upper shank portion 6 of the wedge member 5 a rectangular link 10 is slidably arranged. The downward movement of this link is limited by the binding engagement of the obtusely inclined edge 9 of the wedge plate 7 with one of the inner edges of the link. One end of this link is centrally bifurcated, as at 11, said end being formed with transverse openings 12 to receive a pin 13. Upon this pin 13 a key 14 is pivoted. Upon reference to Fig. 1, it will be noted that the upper end of the key 14 is substantially semi-circular in form and is laterally extended to provide a shoulder 14'. It will further be observed that the pin 13 extends eccentrically through this rounded upper end of the key whereby a cam 15 is formed. This cam is adapted to bind upon the curved longitudinal edge 8 of the wedge member 5 to support the key in an elevated position, as indicated in dotted lines in said figure, whereby it will be obvious that the wedge plate 7 may be much more easily and conveniently arranged in the lewis hole of the stone than would be possible if means were not provided to support the key in its elevated position. The upper end of the shank 6 is formed with an eye 16 in which a link 17 is arranged. This link is adapted to receive the hook of a chain in the usual manner, and may be greatly varied in form, the particular form shown in the accompanying drawings being one of many commonly used.

A lewis constructed in the manner above set forth has been found to be highly efficient in its operation, the dangers incident to the lifting of heavy stones being eliminated and a device is provided which will effectually hold the stone in suspension while the same is being lifted, its peculiar form obviating the liability of its release from the lewis hole. The device may be easily and quickly arranged in the lewis hole by first elevating the link 10 and key 14 upon the shank of the wedge member, the key then being moved outwardly to engage the cam 15 formed thereon with the longitudinal edge of the shank. The key is thus held in an elevated position while the wedge plate 7 is positioned in the lewis hole. After being properly arranged, the key 14 is released from its elevated position and moved downwardly on the shank together with the link 10. The key is forced into the opening in the stone between one of the vertical walls thereof and the inclined edge 9 of the wedge plate 7. As the key 14 is thus arranged in position, the longitudinal edge thereof opposed to the edge of the wedge plate is frictionally engaged upon said plate, said engaging surfaces being perfectly flat. The other longitudinal edge of the key is rounded as shown at 14$^a$ similar to the inclined edge 9$^a$ of the wedge plate and is adapted to engage with the other end wall of the lewis hole. The key when securely forced into the opening and frictionally engaged with the wedge plate and the wall of the lewis hole will wedge said plate in position between itself and the other vertical wall of the hole. The binding of the key and plate upon the walls of the hole and the pressure exerted thereon when the stone is lifted will tend to force the key and wedge plate into closer binding engagement with each other and with the walls. Consequently, it will be apparent that it is not essential that the whole of the wedge plate 7 be positioned in the opening of the stone, thereby eliminating the necessity of cutting the hole of great depth, the key and the plate having the same binding engagement with the walls of the opening at any point throughout their length.

From the foregoing it is believed that the construction and operation of our improved lewis will be readily understood. In the use of a device of this character as at present constructed, it is necessary to exercise great care in the cutting of the lewis hole so that the key will properly engage with the wall thereof to obtain the desired friction. By means of our improved device, however, it is only necessary that there be a single point of contact between the longitudinal edge of the key and the edge of the wedge plate and the walls of the opening to lock the wedge plate therein against all possibility of its inadvertent or accidental release. The shoulder 14′ formed upon the key is adapted to limit its inward movement into the lewis hole so that in the event that the hole is of greater depth than the key, the wedge plate 7 may be moved upwardly through the link with respect thereto and the lower end of said plate brought into engagement with the key and the wall of the opening.

While we have shown and described the particular form of the device which is best adapted for the purposes in view, it will be understood that the same is susceptible of various minor modifications without departing from the spirit or sacrificing any of the advantages thereof.

Having thus described the invention what is claimed is:—

1. A lewis comprising a wedge member, a movable element associated with said wedge member, a key pivotally carried by said element movable upon one edge of the wedge member, said key being movable to a position at right angles to the wedge member, and means for locking the key in such position.

2. A lewis comprising a wedge member, one end of said member having diverging longitudinal edges to form a wedge plate, one of said edges being rounded, the edges of the remaining portion of said member being parallel, a link movable on said member above the wedge plate, and a key pivotally mounted at one end in said link, said key having a cam formed on its pivoted end adapted for binding engagement with the wedge member to support said key thereon above the wedge plate, said key having one of its longitudinal edges rounded, the rounded edge of said key and wedge plate being adapted for frictional engagement with the end walls of a lewis hole.

3. A lewis comprising a wedge member, a longitudinally movable element associated with said wedge member, a key pivotally carried by said element disposed upon one edge of the wedge member, said key being movable to a position at right angles to the wedge member, and a cam formed on the pivoted end of the key to lock the same and the movable element on said wedge member.

4. A lewis comprising a wedge member having a wedge plate formed on one end, said plate being provided in each face with a longitudinally extending concavity and having one of its edges rounded, a link longitudinally movable upon the remaining portion of the wedge member, a key pivotally mounted at one end in the end of said link and movable upon one of the longitudinal edges of the wedge plate for binding engagement therewith, said key having a cam formed upon its pivoted end adapted for binding engagement with the wedge member when the key is moved outwardly therefrom whereby said key is supported on said member above the wedge plate, said key having a shoulder adjacent to its pivoted end for engagement with a stone to limit its movement into the lewis hole, one of the longitudinal edges of said key being rounded for engagement with the walls of the lewis hole.

5. A lewis comprising a wedge member, a link longitudinally movable on said member, a key pivoted at one end to said link and disposed upon one of the longitudinal edges of said member, said key being movable outwardly from the link to a position at right angles to said wedge member, and means for supporting said key and link upon the wedge member against movement thereon.

6. A lewis comprising a wedge member, one end of said member being enlarged to form a wedge plate, a link longitudinally movable on said member, a key pivoted in said link and adapted to be moved outwardly at a right angle to the wedge member, and means for holding the key in the latter position and preventing longitudinal movement of the link on the wedge member.

In testimony whereof we hereunto affix our signatures in the presence of two witnesses.

ALEXANDER A. BIRNIE.
ALBERT H. DESILETS.

Witnesses:
F. L. TUCKER,
F. L. SARGENT.